April 8, 1958     H. W. LORD     2,830,262
MAGNETIC CORE TEST APPARATUS
Filed Sept. 7, 1955
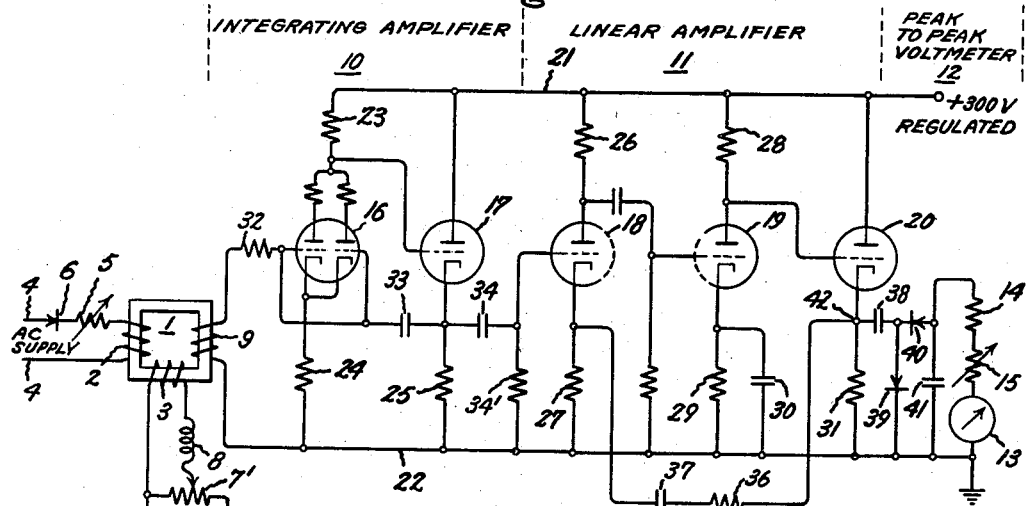
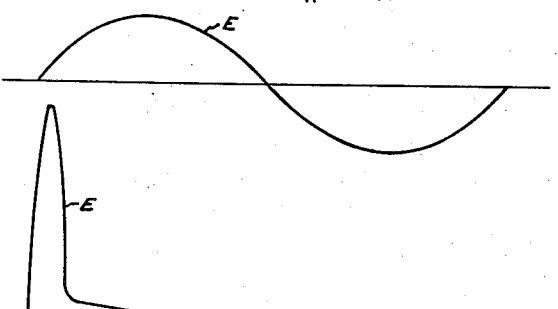
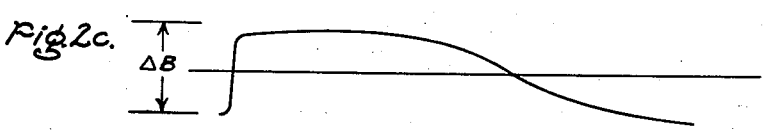
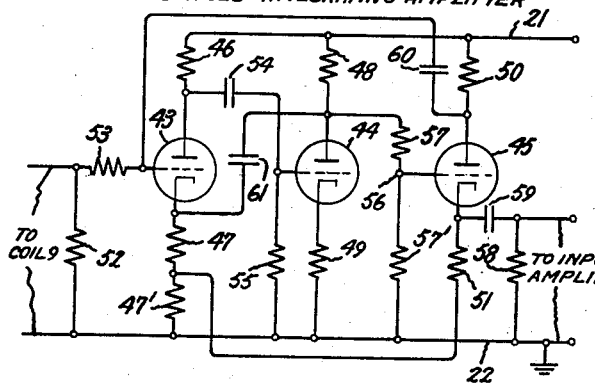
Inventor:
Harold W. Lord,
by Richard R. Brainard
His Attorney.

United States Patent Office 2,830,262
Patented Apr. 8, 1958

2,830,262

MAGNETIC CORE TEST APPARATUS

Harold W. Lord, Schenectady, N. Y., assignor to General Electric Company, a corporation of New York Application September 7, 1955, Serial No. 532,895

3 Claims. (Cl. 324—34)

My invention relates to improved magnetic core testing apparatus and more particularly to an improved circuit for measuring and indicating the total flux change in the core under test during a complete cycle of the energizing voltage.

Magnetic cores used in apparatus for measurement, control or amplifying purposes should be reproducible readily so that circuits having predictable operating characteristics may be manufactured by mass production methods. Magnetic amplifiers are one example of such a use of magnetic cores and in the manufacture of these amplifiers, it is desirable to be able to test readily on a production basis the characteristics of the cores, such as the total flux change in the core during a predetermined cycle of excitation of the core. Since these cores may operate in a region of saturation, peaked voltages are encountered in test as well as in use. In accordance with my invention, I provide an improved circuit which gives such a direct indication of the peak-to-peak flux change in the core under test.

In a widely used type of core testing circuit, a pick-up coil coupled to the core under test supplies a rectified average reading vacuum tube voltmeter and this reading is converted to an indication of flux change by multiplying the voltage reading by $10^8$ and dividing by the product of twice the area of the core, the number of turns in the pick-up coil and the frequency of the energizing voltage. In addition to the dependence of the above calculation on frequency and the necessity of knowing the area of each core and the number of turns in the pick-up coil, the flux conditions produced in the core under test often result in peak voltages having a very high amplitude over a very short portion of a total energizing cycle. These voltage wave shapes impose very severe requirements upon the amplifier of the voltmeter, and the conventional voltmeters available accordingly are not able to provide accurate indications of the average voltage under these conditions.

In accordance with my invention, I provide an integrating and amplifier circuit which produces an output voltage which varies in time in the same manner as the flux in the core. This output is coupled to a peak-to-peak reading voltmeter which in turn energizes the indicating circuit so that the output reads directly in accordance with the peak-to-peak flux change in the magnetic core under test during a complete energizing cycle.

It is accordingly an important object of my invention to provide a new and improved direct reading indicating circuit for measuring the flux change in a magnetic core under test. Further objects and advantages will become apparent as the following description proceeds, reference being had to the accompanying drawing in which Fig. 1 is a schematic diagram of an indicating circuit embodying my invention and coupled to a magnetic core under test, Figs. 2(a), 2(b) and 2(c) illustrate schematically certain electrical conditions existing in the apparatus of Fig. 1, and Fig. 3 illustrates a modified form of integrating amplifier for use in the apparatus of Fig. 1.

Referring now to Fig. 1 of the drawing, I have shown a rectangular laminated magnetic core which is of a type suitable for use in a half-wave magnetic amplifier circuit and which is provided with exciting coils 2 and 3. Coil 2 is connected to a source of alternating current voltage 4 through a variable resistor 5 and a rectifier 6. The coil 3 is connected to be energized from a variable voltage direct current source provided by the battery 7 and parallel-connected resistor 7'. The connection with the coil 3 is preferably made through an inductance 8. These circuits for exciting the coil under test will be readily recognized by those skilled in the art as corresponding respectively to the supply voltage and the reset voltage supplies used in half-way magnetic amplifier circuits. It will be appreciated that the energizations are such as to produce magneto-motive forces in opposite directions in the core 1.

The measuring and indicating circuit of my invention is coupled to the core 1 under test by means of a pick-up or output coil 9 which is connected to the input circuit of an integrating amplifier designated generally by the numeral 10. The output of the integrating amplifier 10 is supplied to linear voltage amplifier 11 which in turn energizes a peak-to-peak voltmeter 12 connected to supply a load circuit including a milliammeter 13 connected in series with resistor 14 and variable resistor 15.

The circuits just mentioned include a plurality of vacuum tubes designated by numerals 16–20, inclusive, having their anode-cathode circuits connected between direct current supply provided by conductors 21 and 22 and which may, for example, be a 300-volt-regulated supply. Thus, tube 16 is a twin triode having the anodes connected together and to conductor 21 through plate resistor 23 and the cathode thereof connected to conductor 22 through cathode resistor 24. Tube 17 is connected between conductors 21 and 22 with resistor 25 in series with the cathode. Tube 18 is connected to conductors 21 and 22 through anode resistor 26 and a cathode resistor 27. Tube 19 is connected with conductors 21 and 22 through anode resistor 28 and a cathode circuit including parallel-connected resistor 29 and capacitor 30, and tube 20 has the anode thereof connected directly with conductor 21 and the cathode connected to conductor 22 through cathode resistor 31. Conductor 22 is connected to one terminal of the pick-up coil 9 of the core under test and the control electrodes of tube 16 are connected to the other terminal of the pick-up coil through input resistor 32. The control electrode of tube 17 is connected with the plate end of resistor 23 and the cathode of tube 17 is connected with the control electrode of tube 16 through an integrating and blocking capacitor 33. The circuit just described including tubes 16 and 17 provides an integrating amplifier with cathode follower output. This type of output minimizes the loading effect of the capacitor 33 on the output of the amplifier tube 16. The time constant of the integrating circuit is proportional to the product of the input resistor 32 and the capacitor 33 multiplied by the voltage gain of the circuit, including tube 16.

The output of the integrating amplifier is supplied to the control electrode of the tube 18 across input resistor 34' and through a blocking capacitor 34 connected between the cathode of tube 17 and the control member of tube 18. Tube 19 forms a second stage of this amplifier that feeds cathode follower tube 20. This amplifier as a whole is of a type generally known in the art and may be termed an inverse feedback gain stabilized linear amplifier with cathode follower output. The feedback is accomplished by the series circuit including resistor 36 and blocking capacitor 37 connected between the cathodes of tubes 18 and 20.

The output of tube 20 is supplied to a peak-to-peak voltmeter circuit 12 which is electrically the same as circuits frequently referred to as half-wave-type voltage doubling circuits. This circuit includes a capacitor 38 and rectifier 39 connected in series across the cathode resistor 31 of cathode follower 20 with the rectifier poled to conduct in the same direction as that of the tube 20. A second series-connected rectifier 40 and capacitor 41 are connected in series across the rectifier 39 with the rectifier 40 poled to conduct in the opposite direction as the tube 20. The output or meter circuit of this peak-to-peak voltmeter is connected directly across capacitor 41 through resistors 14 and 15.

The operation of a circuit embodying my invention will be better understood from a consideration of the foregoing detailed description together with the operating characteristics illustrated in Fig. 2.

Referring now to Fig. 2, the voltage wave of the alternating current supply circuit 4 is illustrated in Fig. 2(a) as having a sinusoidal variation with time. With a predetermined energization of direct current exciting coil 3, this voltage supply, including resistor 5 and rectifier 6, is effective to produce in the pick-up coil 9 a voltage illustrated by curve 2(b). The flux wave in the core under test which produces the voltage in the pick-up coil illustrated in 2(b) is illustrated in Fig. 2(c). It will be readily apparent that the flux rises rapidly in the core to produce the peak voltage illustrated in Fig. 2(b) and then changes very little during the remainder of the half cycle while the core is saturated. The flux resets gradually over substantially the entire negative half wave of the supply voltage (with respect to the polarity of the rectifier 6) and produces the negative voltage of smaller amplitude and longer duration in the pick-up coil. At or before the end of the cycle the flux reaches the reset value indicated at the beginning of the cycle. The integrating circuit 10, including tubes 16 and 17, is effective to produce an output voltage in accordance with the integral of the voltage of the pick-up coil, as shown in Fig. 2(b), and this curve corresponds directly to the shape of the flux wave in the core illustrated in Fig. 2(c). This is readily apparent since the voltage induced in the pick-up coil 3 and shown in Fig. 2(b) is proportional to the differential of flux with respect to time. The output of the integrating amplifier is further amplified by the linear amplifier 11 so that the output thereof which may be taken from terminal 42 at the junction between the cathode of resistor 31 and the cathode of cathode follower tube 20 has the same form as the flux wave in the core 1 under test as shown in Fig. 2(c).

In accordance with an important feature of my invention, I obtain a direct indication of a total peak-to-peak flux change in the core during a complete cycle of energization by means of a peak-to-peak voltmeter energized from the amplified output of the integrating circuit. As previously described, this peak-to-peak circuit includes the capacitors 38 and 41 and the rectifiers 39 and 40. As will be readily appreciated, the blocking and doubling capacitor 38 is charged in the direction indicated through rectifier 39 when the conductivity of the tube 20 increases. When the conductivity decreases, capacitor 41 charges through rectifier 40 to a voltage determined by the voltage of point 42 plus the voltage on capacitor 38. In this way, the peak-to-peak voltage change at terminal 42 corresponding to the total peak-to-peak flux change in the core under test is indicated on the instrument 13 connected across the capacitor 41.

From the foregoing detailed description, it is apparent that by the provision of an integrating amplifier and a peak-to-peak voltmeter as a circuit for energizing a direct reading instrument from the pick-up coil of a magnetic core, I am able to provide a simplified apparatus for determining the peak-to-peak flux change in the magnetic core under test. It is also an advantage of my invention that the operation of the system is totally independent of frequency which is very desirable when tests are to be made at two different frequencies. It is also apparent that an instrument responding to the integral of the voltage induced in the pick-up coil is not subjected to the high peaks of short duration that characterize circuits in which this induced voltage is measured directly.

In the operation of the system shown in Fig. 1, there may be some tendency for the integrating amplifier 10 to change gain due to changes in tube characteristics which may occur during warm up or with life of the tubes or when they are replaced. In Fig. 3 I have shown a modification of this integrating amplifier which includes a stabilizing feedback connection and an additional stage of amplification which may be employed in place of the amplifier 10 with the input connected to be energized from the pick-up coil 9 and the output connected to supply an input signal to the linear amplifier 11. As illustrated in Fig. 3, the amplifier includes an electric discharge device 43 corresponding generally to the discharge device 16 in Fig. 1, an additional stage of amplification including discharge device 44 and a third electric discharge device 45 corresponding in part to the cathode follower 17 of Fig. 1. The plate circuits of these electric discharge devices are completed to the direct current supply conductors 21 and 22 corresponding directly to conductors 21 and 22 of Fig. 1. The plate circuit of valve 43 includes a plate resistor 46 and a tapped cathode resistor including the sections 47 and 47'. The plate circuit of valve 44 includes plate resistor 48 and cathode resistor 49 while the plate circuit of valve 45 includes plate resistor 50, cathode resistor 51 and the resistor section 47' of the cathode circuit of discharge device 43. The input signal is impressed across an input resistor 52, one terminal of which is connected to the grid of discharge device 43 through series grid resistor 53. The plate of device 43 is coupled to the grid of device 44 through a coupling and blocking capacitor 54, the grid also being connected to the grounded conductor 22 through resistor 55. The grid of output discharge device 45 is connected to an intermediate point 56 on voltage dividing resistor 57, 57' connected between the plate of discharge device 44 and the grounded conductor 22. The output of tube 45 is supplied to an output resistor 58 connected in series with a blocking capacitor 59 and across the cathode resistors 51 and 47' of device 45. An integrating feedback connection is provided from the plate of tube 45 to the grid of tube 43 through an integrating capacitor 60. A portion of the output voltage of device 45 is fed back by means of resistor 47' to the input circuit of device 43 to minimize the tendency of the system to change gain. A stabilizing feedback connection with respect to high frequency may also be provided, if desired, between the plate of discharge device 44 and the cathode of discharge device 43 by means of a capacitor 61. The circuit just described in connection with Fig. 3 operates in general in the same manner as the amplifier 10 of Fig. 1 except that the tendency of the amplifier to change gain is eliminated while the additional circuit components are kept at a minimum.

While I have shown and described a particular embodiment of my invention, it will be apparent to those skilled in the art that modifications may be made without departing from my invention and I, therefore, aim by the appended claims to cover any such modifications as fall within the true spirit and scope of my invention.

What I claim as new and desire to secure by Letters Patent of the United States is:

1. A circuit for measuring the peak-to-peak flux change in a magnetic core under test during a complete cycle of energization, said circuit comprising input winding means for subjecting said core to a repeating cycle of flux variation and a pickup coil inductively coupled with the core for producing a voltage responsive to said cycle of flux variation, comprising an integrating circuit for energization from said pick-up coil, a peak-to-peak voltage responsive circuit energized in accordance with the output of said integrating circuit and a meter connected for energization from said last-mentioned circuit.

2. A circuit for providing a direct indication of the peak-to-peak flux change in a magnetic core during a complete cycle of energization, said circuit comprising input winding means for subjecting said core to a repeating cycle of flux variation and a pickup coil inductively coupled with the core for producing a voltage responsive to said cycle of flux variation, comprising an integrating circuit responsive to the voltage generated in said coil, an amplifier connected for energization in response to the output of said integrating amplifier circuit, a peak-to-peak voltage measuring circuit connected for energization in response to the output of said amplifier and a meter responsive to the output of said peak-to-peak voltage measuring circuit.

3. A circuit for providing a direct indication of the peak-to-peak flux change in a saturable magnetic core during a complete cycle of energization, said circuit comprising input winding means for subjecting said core to a repeating cycle of flux variation and a pickup coil inductively coupled with the core for producing a voltage responsive to said cycle of flux variation, comprising an integrating amplifier circuit responsive to the voltage generated in said coil, a linear stabilized amplifier connected to respond to the output of said integrating amplifier circuit, a peak-to-peak voltage measuring circuit connected to respond to the output of said linear stabilized amplifier and a meter responsive to the output of said peak-to-peak voltage measuring circuit.

References Cited in the file of this patent

The Arnold Engineering Co., Production Testing of Tape Core Materials for Magnetic Amplifiers, by Mitch et al., Conference Paper originally presented at A. I. E. E. Summer and Pacific General Meeting, June 21, 1954.